Patented Apr. 9, 1940

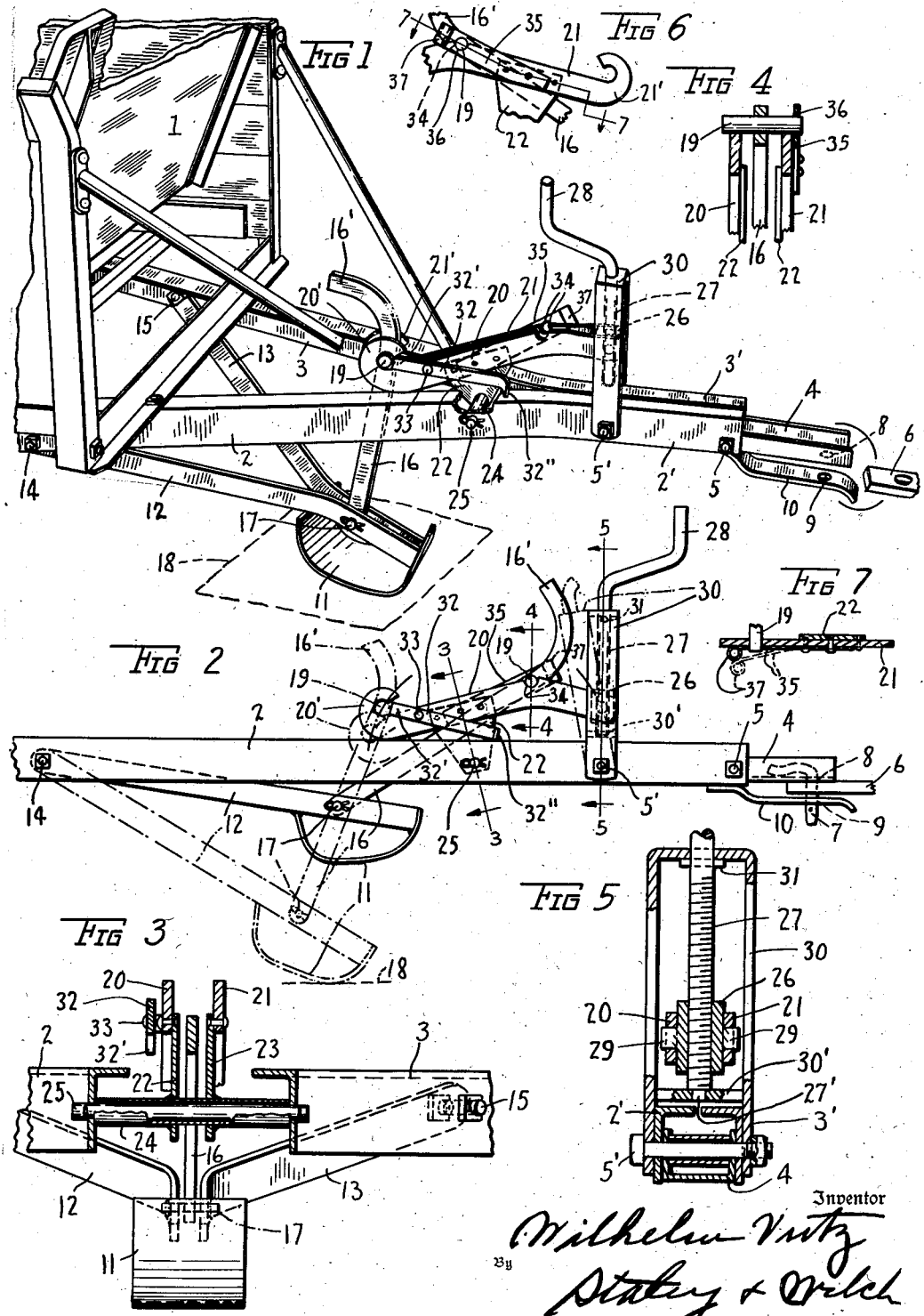

2,196,510

UNITED STATES PATENT OFFICE 2,196,510

ADJUSTABLE TRAILER FRONT END SUPPORT

Wilhelm Vutz, Coldwater, Ohio, assignor to New Idea, Inc., Coldwater, Ohio, a corporation of Ohio Application October 14, 1939, Serial No. 299,446

14 Claims. (Cl. 254—86)

This invention relates to improvements in two-wheeled trailing vehicles such as tractor-drawn manure spreaders.

One of the objects of the invention is the provision of a simple and durable forward end supporting device in which are incorporated means for adjusting the height of the spreader hitch or coupling pole. The value of the feature by which an adjustment of height is made will be seen when it is explained that in designing the trailer spreader, the distribution of weight is such that while the major portion is carried by the spreader wheels, a certain portion of the weight is thrown forwardly to be assumed by the tractor or other towing implement so as to avoid an undesired lifting effect on the tractor. As it is often desirable to carry a percentage of the total trailer load on the tractor draw bar which is greater than is convenient to handle without some assisting means when coupling or uncoupling, the present design provides supporting means for the trailer hitch substantially in working position when the trailer is uncoupled; and it moreover provides safe and quick means to adjust the trailer hitch to the height of the tractor drawbar either with a fully loaded trailer or an empty one.

It can be seen in view of this weight distribution that it is preferable to be able to adjustably elevate or lower the spreader hitch to accommodate the same to the height of the tractor towing arrangement. This object is accomplished in the improved device as will be seen from the description in connection with the drawing. The device also serves as a strut to support the spreader when detached in a substantially horizontal position.

Another object is the provision of an improved device of the character described in which means are incorporated for readily placing the device in the traveling position where interference with the ground is avoided, and as readily replacing in operative position.

In the accompanying drawing:

Fig. 1 is a fragmentary perspective view of so much of a typical two-wheeled spreader as is necessary to illustrate the device and the manner in which it is embodied with the spreader itself.

Fig. 2 is a fragmentary side elevation of the mechanism seen in Fig. 1 and is on substantially the same scale.

Fig. 3 is a partial transverse sectional view taken on the line 3—3 of Fig. 2, the view being on a slightly enlarged scale.

Fig. 4 is a partial transverse sectional view on the same scale as Fig. 3, the section being taken on the line 4—4 of Fig. 2.

Fig. 5 is a partial transverse sectional view on the line 5—5 of Fig. 2, the scale being the same as in Figs. 3 and 4.

Fig. 6 is an elevation of the opposite side of the portion of the mechanism shown in Fig. 2.

Fig. 7 is a section on the line 7—7 of Fig. 6.

Referring to the drawing, the forward portion of the spreader bed only is shown and is indicated at 1. Attached to the under side of the spreader bed frame is a pair of angle members 2 and 3 which are extended forwardly and converge to form a V forwardly of the bed and which are further extended in substantially parallel relation as shown at 2' and 3'. The angle members 2 and 3 will be considered as a forward frame structure to distinguish from a third member 4 in the form of an upturned channel which in the present case is employed as the actual hitch member, it being bolted by bolts 5 and 5' between the downturned legs of frame members 2 and 3.

A hitch member such as indicated at 4 may or may not be necessary depending on the type of hitch arrangement found on the tractor or other towing implement. At 6 there is conventionally shown a portion of a tractor draw bar; in Fig. 1 it is assumed that the spreader is detached, while in Fig. 2 it is coupled to the tractor. The coupling pin, Fig. 2, is represented at 7, it passing through an opening 8 in the horizontal portion of the hitch member 4 and through an aligned opening 9 in a guide strip 10 attached to the member 4. It will be understood that although the spreader wheels have been omitted in the drawing, support for the spreader when coupled is afforded by the tractor draw bar 6 and the wheels.

As a supporting means for the spreader forward end when uncoupled as in loading when the tractor is being put to other uses, there is provided the device now to be described. The support consists of a shoe 11 attached as by welding to a pair of bars 12 and 13 which are slightly spaced apart and substantially parallel at their points of attachment with the shoe 11 but which diverge or spread outwardly towards the forward frame members 2 and 3 to which they are pivotally attached by the bolts 14 and 15.

Between the bars 12 and 13 over the shoe 11 is inserted the lower end of a strut 16 pivotally connected by the pin 17 to the arms 12 and 13. The strut 16 and shoe 11 assume the greater portion of the weight of the forward end of the spreader when uncoupled, the shoe 11 resting on the ground surface conventionally represented at 18. The downward pressure of the forward end may be said to cause an upward thrust on the strut 16 which thrust is transmitted by a trunnion pin 19 to the hooked ends 20' and 21' of a pair of bent lever arms 20 and 21 which have a pivotal connection with the frame members 2 and 3 and with a screw and nut arrangement also pivotally connected with the frame members 2 and 3.

The lever arms 20 and 21 are comparatively closely spaced together in substantially parallel relation as seen in Fig. 3. To the inner face of each lever arm is attached as by rivets a triangular-shaped plate such as is indicated at 22 and 23, each of which has an aligned opening through which is passed a tube 24 which may be secured to the plates 22 and 23 by welding as seen in Fig. 3. The tube 24 acts as a bearing for the pivotal connection of the lever arms 20 and 21 with the frame members 2 and 3, the pivot pin on which the lever arms fulcrum being the pin 25 which is inserted through aligned openings in the down-turned legs of the forward frame members 2 and 3.

To divide the thrust between the lever arms 20 and 21, the upper end of the strut 16 is positioned between the lever arms as seen in Fig. 1 or 3. When, as stated, the trunnion pin 19 is engaged by the hooked ends 20' and 21', which is the operative position, the thrust is transmitted to the frame members 2 and 3 through the previously mentioned screw and nut arrangement.

The right or forward ends of the lever arms 20 and 21 are spread apart to receive a nut 26 threaded on a screw 27 having a crank handle 28, and to provide a pivotal connection for the nut and lever arms, the nut is furnished with preferably integral trunnions 29 on the diametrically opposed vertical sides of the nut 26. Openings are provided in the forward or right hand ends of the lever arms, so that the arms pivot on the trunnions 29, one way to assemble the lever arms and the nut being to spring the arms apart sufficiently to allow them to pass over the ends of the trunnions.

The screw 27 has a bearing in the horizontal portion of an inverted U-shaped crank bracket 30, and another bearing at the lower end in the form of a reduced diameter extension 27' which is inserted in an opening in a cross-bar 30' attached to the inner faces of the U-shaped bracket 30. This cross-bar 30' takes any downward thrust of the screw 27, while to prevent upward displacement of the screw through the bracket, a cross-pin 31 is employed, this cross-pin preferably being a driving fit in a transverse opening in the screw 27. The crank bracket is pivotally connected to the portions 2' and 3' of the frame members 2 and 3 by means of the previously mentioned bolt 5'.

It has been previously mentioned that the downward pressure due to the forward weight of the spreader on the shoe was the equivalent of or produced an upward thrust on the shoe and its strut 16 which was transmitted to the lever arms 20 and 21. It should now be clear that this thrust tends to lower the nut 26, which, however, being threaded on the screw 27, transmits the thrust to the cross-bar 30' and eventually to the forward frame members 2 and 3 which in effect initiated the thrust. Therefore, so long as no change is made in the position of the parts mentioned there will be no change in the relationship between the shoe 11 and the frame members, or since the shoe 11 is resting on the ground surface 18 this can be taken to mean that no change occurs between the height of the hitch member 4 and the ground surface.

Therefore, it is seen that there is provided a forward end supporting device of such nature as to be practically as rigid as if all the parts were securely bolted to the frame members with the added advantage that should it be desired to alter the elevation of the hitch member 4, whether the spreader is loaded or not, with respect to the tractor draw-bar, it is necessary only to rotate the screw 27 accordingly. That is, if the hitch member 4 is too low, the screw 27 is rotated in a clock-wise direction, assuming that the screw has a right-hand thread, which elevates the nut 26 along the screw. This raising of the nut lifts the hitch 4, since the trunnion pin 19 engaged with the hooked ends of the lever arms 20 and 21 becomes temporarily an immovable fulcrum, the shoe resting on the ground surface. On the other hand, rotation of the screw in an anti-clockwise direction lowers the hitch member 4. A latch is provided to assist in retaining the trunnion pin 19 in engagement with the hooked ends 20' and 21' of the lever arms. The latch is in the form of a bar 32 pivotally attached to the lever arm 20 by the pin 33. The latching end 32' of the bar 32 extends toward the trunnion pin 19 (Fig. 1) to bar the pin from slipping out of engagement. To release the trunnion, the longer end 32" which is curved to form a handle is lifted sufficiently high to allow the trunnion to pass over the latching end 32'. The handle end 32", being heavier, returns the latch to operative position automatically on being dropped.

It is preferable, after the coupling with the tractor has been made to place the support in the traveling position so as to avoid damage to the support by accidental contact with the ground. This is readily accomplished by release of the trunnion pin 19 as just described and grasping the strut 16 by the curved end 16' which serves as a handle, and pulling upwardly and forwardly until the trunnion pin 19 is seated in the notches 34 shown in the upper edges of the lever arms 20 and 21. The traveling position is shown in Fig. 2. The return to operative position is quickly made, it being necessary only to lift the trunnion pin 19 from its seat in the notches and to allow the strut to drop, the latch being depressed as the trunnion pin passes over it and returning to latching position.

In making adjustments it is obvious that some of the connected parts go through arcuate movements due to a rocking motion on their respective fulcrum points, for which reason the parts are pivotally mounted. For example, in Fig. 2, different working positions as a result of movements during adjustment are shown by dot-dash lines.

When the foot is in raised position it sometimes happens that on rough ground due to jolting and jarring the pin 19 will jump out of the notch 34 and allow the foot to drop to the ground. In order to avoid this there is provided a latch in the form of a flat spring 35, one end of which is riveted to the outer side of one of the lever arms such as the one 21 and the other one of which is provided with a finger piece 37. This spring arm has a hole 36 which receives an end of the pin 19 (see Figs. 6 and 7 for detail). To lock the pin 19 the spring latch lies in a position shown in full lines in Fig. 7 and in order to release it the operator grasps the finger piece and moves it to the dotted line position shown in that figure.

Having thus described my invention, I claim:

1. In a device of the character described, a frame structure, a shoe pivotally attached to said frame structure, a strut pivotally connected with said shoe, a trunnion carried by said strut, a lever arm arrangement pivotally connected with said frame structure, a nut, means at one end of said lever arm arrangement to engage said strut trunnion, and means on said lever arm arrangement for pivotally connecting the same with said nut, a screw upon which said nut is threaded, a support for said screw pivotally connected with the frame structure, a latch to retain said strut trunnion in engagement with said lever arm arrangement when the parts are in one relationship with each other, and a second means associated with said lever arm arrangement to engage said strut trunnion to retain the strut and shoe after release of said strut from said latch to hold the parts in a different relationship with one another.

2. In a device of the character described, a forward frame structure for a trailer vehicle, a weight-assuming shoe pivotally connected with said frame structure, a strut pivotally connected with said shoe, a trunnion pin on said strut, a lever arm arrangement pivotally connected with the frame structure, a bracket pivotally connected with said frame structure, an elevating and lowering screw rotatably supported by said bracket and having a crank handle at one end, a nut threaded on said screw, a pivoted connection between said nut and an end of said lever arm arrangement, a releasable engagement between said strut and said lever arm arrangement, and a latch on said lever arm arrangement cooperating with said releasable engagement.

3. In a supporting device of the character described, a frame structure, a shoe pivotally connected with said frame structure, a strut connected with said shoe, a lever arm connected with said frame structure, means for releasably engaging said lever arm with said strut, a latch carried by said lever arm cooperating with said means, and means for adjusting rocking said lever arm.

4. In a forward end supporting device for a trailer vehicle, a frame structure connected with said vehicle consisting of a pair of converging members forming approximately a V-shape, a weight-assuming shoe pivotally connected with said frame structure and swingable downwardly therefrom, a strut pivotally connected with said shoe and passing upwardly between said frame members, a trunnion near the upper end of said strut, a lever arm arrangement pivotally connected with said frame structure and lying above said frame structure, means at one end of the lever arm arrangement cooperating with said strut trunnion to releasably engage said strut and lever arm arrangement, means pivotally connected with the said frame structure and operatively connected with said lever arm arrangement to adjust the relationship of the lever arm arrangement with respect to the working parts so that at one working position the distance of the shoe from the frame structure is alterable, means for latching said strut trunnion in engagement with said lever arm arrangement, and other means consisting of notches in the lever arm arrangement to engage with said trunnion whereby when so engaged the shoe is at a considerably lesser distance below the frame structure.

5. In a forward end supporting device for a trailer vehicle, a frame structure connected with said vehicle consisting of a pair of converging members having an approximate V-shape formation forwardly of the vehicle, a weight-assuming shoe pivotally connected with said frame structure and swingable downwardly therefrom, a strut pivotally connected with said shoe and passing upwardly between said converging frame members, a trunnion pin transversely disposed on said strut near its upper end, a lever arm arrangement pivotally connected with said frame structure and lying thereabove, means at one end of said lever arm arrangement for releasably engaging said strut trunnion pin, said lever arm arrangement consisting of a pair of substantially identical spaced-apart members to permit the strut to be positioned therebetween, means pivotally connected with the frame structure for adjusting the relationship of the lever arm arrangement with respect to the other working parts, means associated with said lever arm arrangement and cooperating with said strut trunnion for releasably latching said strut with the lever arm arrangement to provide one working position of the shoe, and other means associated with the lever arm arrangement and said strut for retaining the shoe in another position at a greater elevation than said firstmentioned position.

6. In a device of the character described, a forwardly extending frame member, a lever pivotally connected therewith, adjustable means at one end of said lever for holding the lever in a fixed position relative to the frame member, a ground support for said frame member, detachable means for pivotally connecting said ground support with the other end of said lever, and means at another point on said lever to engage that part of the detachable means which is connected with the ground support to hold said support above the ground line.

7. In a device of the character described, a forwardly extending frame member, a lever pivotally connected therewith, a ground support, means for detachably connecting said ground support with one end of said lever comprising at least one trunnion engageable with an end of said lever, adjustable means at the other end of said lever for holding said lever in a fixed position relative to said frame member, and means on said lever to engage said trunnion when detached to hold the ground support above the ground line.

8. In a device of the character described, a forwardly extending frame member, a lever pivotally connected therewith, adjustable means at one end of said lever for holding said lever in a fixed position relative to said frame member, a ground support for said frame member, detachable means for pivotally connecting said ground support with the other end of said lever, and means at another point on said lever to engage that part of the detachable means which is connected with the ground support to hold said support above the ground line including a device for detachably securing said two last mentioned means together.

9. In a device of the character described, a forwardly extending frame member, a lever pivotally connected therewith, a ground support, means for detachably connecting said ground support with one end of said lever comprising at least one trunnion engageable with an end of said lever, adjustable means at the other end of said lever for holding said lever in a fixed position relative to said frame member, a notch on said lever to engage said trunnion when detached to hold the ground support above the ground line, and a releasable spring latch connected with said lever and engageable with said trunnion to hold said trunnion in said notch.

10. In a device of the character described, a forwardly extending frame member, a lever pivotally connected therewith, adjustable means at one end of said lever to vary the distance between that end of said lever and said frame member, a ground support for said frame member, and means for pivotally connecting said ground support with the other end of said lever, said pivotal connection with the ground support forming a fixed fulcrum for said lever to cause said lever to vary the height of said frame when adjusted.

11. In a device of the character described, a forwardly extending frame member, a lever pivotally connected therewith, extensions from said frame member pivotally connected therewith at their inner ends, a supporting shoe connected with said extensions at their forward ends, a strut pivotally connected with said extensions and also pivotally and detachably connected with one end of said lever, adjustable means at the other end of said lever for holding said lever in fixed position with relation to said frame, and means to engage said strut and said lever at a point in the length of said lever remote from said detachable connections between said strut and lever.

12. In a device of the character described, a frame member, a ground support for said frame member, a lever pivoted to said frame member intermediate the ends of said lever, means to fixedly fulcrum one end of said lever from said ground support, and adjustable means to alter the other end of said lever with relation to said frame member to raise or lower said frame.

13. In a device of the character described, a frame member having a hitch device at its forward end, a ground support for said frame member, a lever pivoted to said frame member intermediate the ends of said lever, means to fixedly fulcrum one end of said lever from said ground support, and adjustable means to alter the position of the other end of said lever with relation to said frame member to raise or lower said frame and its hitch device.

14. In a device of the character described, a frame member, a ground support for said frame member comprising an upwardly extending strut pivotally connected with said frame member, a lever pivoted to said frame member intermediate its ends, a fixed fulcrum at the upper end of said strut for one end of said lever, and adjustable means to alter the position of the other end of said lever with relation to said frame member to raise or lower said frame.

WILHELM VUTZ.